Jan. 9, 1951
R. L. KLEIN
2,537,591
WEAR RESISTANT MATERIAL AND METHOD
OF MAKING SUCH MATERIAL
Filed Oct. 10, 1945
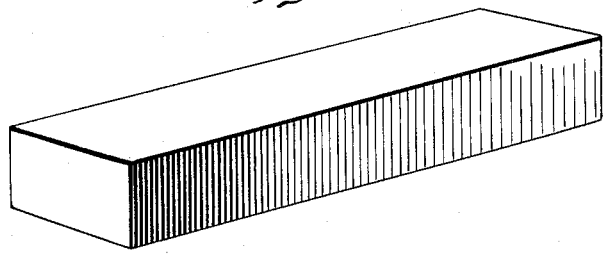
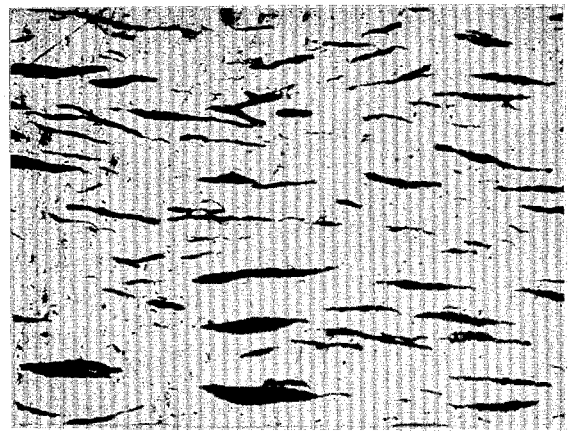
INVENTOR
ROBERT L. KLEIN
BY
Luther W Hawley.
ATTORNEY Patented Jan. 9, 1951

2,537,591

UNITED STATES PATENT OFFICE 2,537,591

WEAR RESISTANT MATERIAL AND METHOD OF MAKING SUCH MATERIAL

Robert L. Klein, Shrewsbury, Mass., assignor to The Trustees of Stevens Institute of Technology, Hoboken, N. J., a corporation of New Jersey Application October 10, 1945, Serial No. 621,478

7 Claims. (Cl. 171—325)

This invention relates to wear resistant material used in conjunction with moving surfaces—such, for instance, as the brush in a motor or generator.

It has been found that the generator brushes in aircraft engines used at high altitudes wear out much more quickly than under normal conditions and have a very short life. It has become essential, therefore, for successful air operation to develop a brush material that will wear longer under high altitude conditions. To accomplish this purpose the material hereinafter described and claimed was developed but it should be understood that although the material is well adapted for the particular use for which it was developed, it is not the intention to so limit the use.

The invention has for its salient object to provide a wear resistant material for use in conjunction with moving surfaces.

Another object of the invention is to provide a material particularly adapted for use as a motor or generator brush and so constituted that minimum wear will take place under high altitude conditions.

Further objects of the invention will appear from the following specification taken in connection with the drawings which form a part of this application, and in which Fig. 1 is a perspective view of a metal bar embodying the invention; and Fig. 2 is a view showing a micro-photographic representation of a section of the bar in Fig. 1.

The invention consists broadly of a material with a metallic matrix in which are interspersed particles of flake graphite. The purpose of the graphite is to lower the coefficient of friction and thereby heating and wear when this material is used in contact with a moving surface, such as a brush in a generator or motor.

Most natural graphite and possibly artificial graphite is made up of a flake-like structure, that is, like mica. It consists of thin plates which are relatively much larger in width and breadth than in thickness, which shall hereafter be referred to as the edge. It has been discovered that when a body contains graphite whose edge is perpendicular to the moving surface, the wear on the body and on the surface is much greater than the wear when the flat section of the graphite is alined parallel to the moving surface.

This invention, therefore, further contemplates the preferential placing of the graphite with respect to the plane of the surface in relative movement therewith.

The principal and most satisfactory method of producing a metallic matrix containing graphite inclusions is by powder metallurgy—that is, mixing the metal powder or powders with the graphite flake powder, pressing the material and heating either during or after pressing.

The invention further involves a method of preferentially alining the graphite flakes in the metal powder matrix so that the resulting body may be used satisfactorily as a wear resisting material in contact with moving surfaces.

The technique consists of using a flake grade of graphite in conjunction with a flake grade of metal powder and pressing the material in a die at high pressure. If a mixture of metal powders is used, not all of the powder need be flaked, but it is thought that at least 50% by weight should be. Added strength is given to the pressed body, as stated above, by heating either during or subsequent to the pressing, although this is not always necessary.

One example of a composition with oriented graphite that showed most satisfactory anti-wear properties or characteristics under severe conditions was constituted as follows; the percentages being given by weight:

| | Per cent |
|---|---|
| Flake silver powder | 80 |
| Lead powder | 10 |
| Tin powder | 5 |
| Graphite powder | 5 |

The components were thoroughly mixed in an ordinary mixing mill and were then pressed in a die at approximately 30 tons per square inch pressure.

Some of the bars so pressed were sintered at 660° F. for 40 minutes. Thereafter, both sintered and unsintered bars were tested under conditions simulating those encountered by aircraft at high altitudes and showed very little wear as compared with the materials previously known and available which wore very rapidly.

The particular metals and proportions, above given, although satisfactory and furnishing a practical example of the composition, should not be considered absolutely essential and the invention is not limited to these specific metals nor proportions.

For example, the weights may be varied as follows:

| | Percent |
|---|---|
| Flake silver powder | 60–90 |
| Lead powder | 0–10 |
| Tin powder | 0–10 |
| Graphite powder | 0–10 |

In the above table the listing of proportions as 0–10% assumes some weight between 0 and 10% and should not be interpreted to mean in any instance the use of 0%.

Moreover, the invention as it relates to the method of orienting of alining graphite flakes in a metal matrix is not limited to the particular

What I claim is:

1. A compressed metallic matrix containing at least 60% flake silver powder and flake graphite inclusions oriented to be disposed substantially parallel to a common plane and distributed substantially uniformly throughout the metallic matrix.

2. A metal bar containing at least 60% flake silver powder and having flake graphite interspersed substantially uniformly therein and oriented to be disposed substantially parallel to a common plane.

3. A metal bar having as its major constituent flake silver powder and having flake graphite interspersed substantially uniformly therein and oriented to be disposed substantially parallel to a common plane.

4. A metallic bar comprising silver, lead, tin and graphite flakes, the major constituent being silver and the graphite flakes being oriented to be disposed substantially parallel to a common plane.

5. A metallic bar comprising the following metals and approximate proportions by weight, silver 80%, lead 10%, tin 10% and flake graphite 5%.

6. A metallic bar comprising the following metals and approximate proportions by weight, silver 80%, lead 10%, tin 10% and flake graphite 5%, said graphite being oriented to be disposed substantially parallel to a common plane.

7. A metallic bar comprising the following metals and approximate proportions by weight, silver 60–90%, lead 0–10%, tin 0–10% and flake graphite 0–10%.

ROBERT L. KLEIN.

REFERENCES CITED

The following references are of record in the file of this patent:

UNITED STATES PATENTS

| Number | Name | Date |
|---|---|---|
| 656,652 | Markey | Aug. 28, 1900 |
| 849,643 | Speers | Apr. 9, 1907 |
| 1,379,366 | Seabury | May 24, 1921 |
| 1,541,609 | Adams | June 9, 1925 |
| 1,556,990 | Henry | Oct. 13, 1925 |

OTHER REFERENCES

Balza: A Course in Powder Metallurgy, published by Rheinhold Publishing Company, New York City, 1943, page 26.

Wulff: Powder Metallurgy, published by American Society for Metals, Cleveland, Ohio, 1942, pages 21 and 22.